(12) United States Patent
Yang (10) Patent No.: US 8,274,788 B2
(45) Date of Patent: Sep. 25, 2012

(54) LOCKING MECHANISM AND PORTABLE COMPUTER UTILIZING THE SAME

(75) Inventor: Li-Jun Yang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 270 days.

(21) Appl. No.: 12/869,697

(22) Filed: Aug. 26, 2010

(65) Prior Publication Data

US 2011/0194239 A1    Aug. 11, 2011

(30) Foreign Application Priority Data

Feb. 5, 2010    (CN) .......................... 2010 1 0301286

(51) Int. Cl.
*G06F 1/16*         (2006.01)
*E05B 69/00*        (2006.01)
*E05C 17/56*        (2006.01)
*E05C 19/10*        (2006.01)

(52) U.S. Cl. ......... 361/679.58; 361/679.57; 361/679.56; 361/679.55; 70/58; 292/251.5; 292/121

(58) Field of Classification Search .. 361/679.01–679.3, 361/679.55–679.59; 70/58; 292/251.5, 121; 211/26
See application file for complete search history.

(56) References Cited

U.S. PATENT DOCUMENTS

| 6,517,129 | B1 * | 2/2003 | Chien et al. ................. 292/251.5 |
| 7,216,900 | B2 * | 5/2007 | Liu et al. .......................... 292/98 |
| 7,405,927 | B2 * | 7/2008 | Lev ............................ 361/679.55 |
| 8,085,533 | B2 * | 12/2011 | Zhao et al. ................ 361/679.58 |
| 8,109,541 | B2 * | 2/2012 | Chang et al. ..................... 292/95 |
| 2002/0089190 | A1 * | 7/2002 | Wang et al. ................. 292/251.5 |
| 2008/0179897 | A1 * | 7/2008 | Wu et al. .................... 292/251.5 |
| 2010/0053857 | A1 * | 3/2010 | Zhu et al. ................. 361/679.01 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A portable computer includes a base, a display panel rotatably connected to the base, a locking mechanism mounted to the display panel, and a security lock. The base includes a receiving chamber and a hole communicating with the receiving chamber. The locking mechanism includes a main body, a rotation member rotatably connected to the display panel, and a sliding member. The rotation member includes an extending end defining a receiving hole. The extending end is operable to be received in the receiving chamber. The sliding member includes a hook portion being received in the receiving hole. The hook portion is capable of disengaged from the receiving hole, causing the extending end to rotate by the thereof. The security lock includes a latch for engaging the extending end to prevent the extending end of the rotation member from disengaging from the base, to lock the display panel to the base.

13 Claims, 8 Drawing Sheets

LOCKING MECHANISM AND PORTABLE COMPUTER UTILIZING THE SAME

BACKGROUND

1. Technical Field

The present disclosure relates to locking mechanisms and, particularly, to a portable computer which can be locked by the locking mechanism.

2. Description of Related Art

A notebook computer can be locked to a table by a security lock, to prevent it from being stolen. However, a conventional security lock usually does not lock the display to the base of the notebook computer. An unauthorized person still has a chance to open the display and access data stored on the notebook computer.

DETAILED DESCRIPTION

Figure 1:
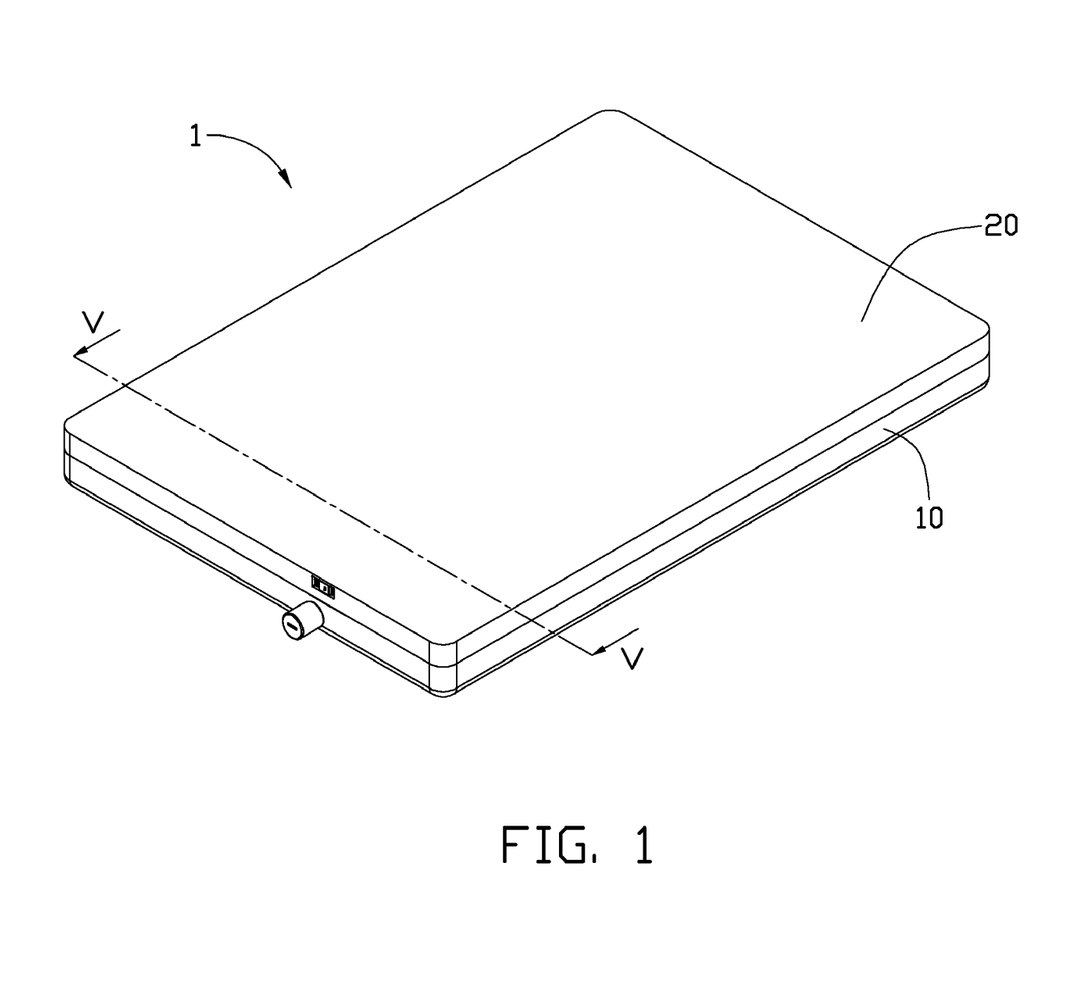
FIG. 1 is an isometric view of a portable computer in accordance with an exemplary embodiment.
Figure 2:
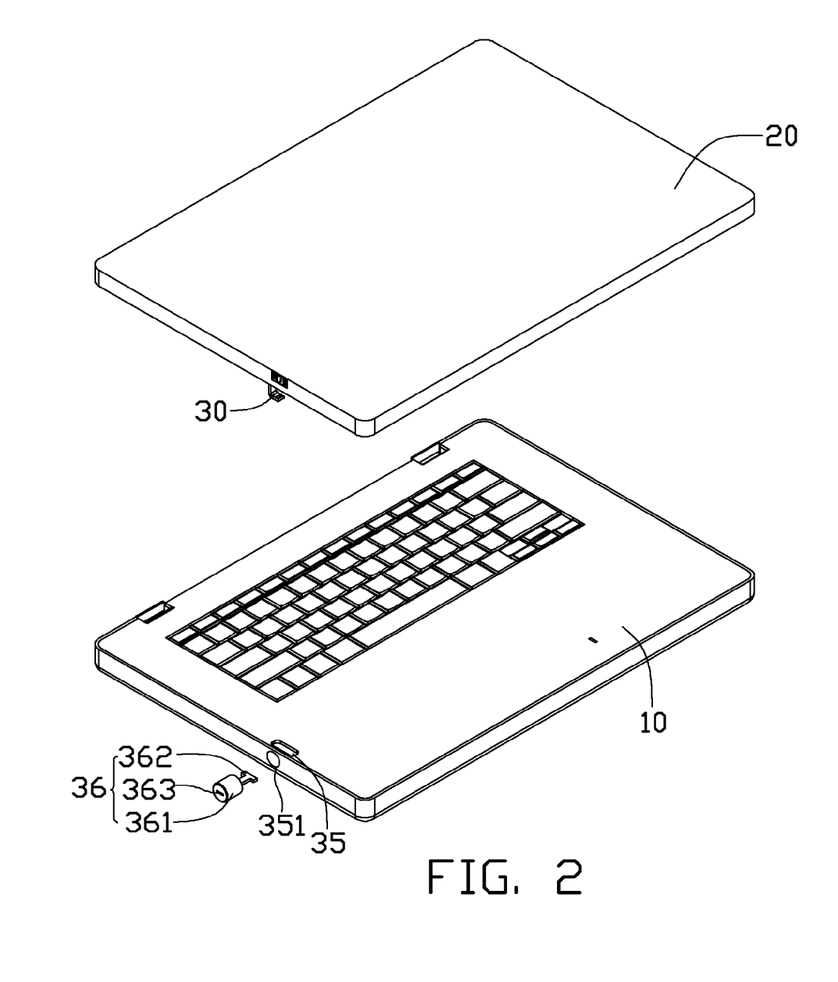
FIG. 2 is a partially exploded view of the portable computer of FIG. 1.

Referring to FIGS. 1-2, an embodiment of a portable computer 1 is illustrated. The portable computer 1 includes a base 10, a display panel 20 and a locking mechanism 30 for locking the display panel 20 to the base 10.

Figure 3:
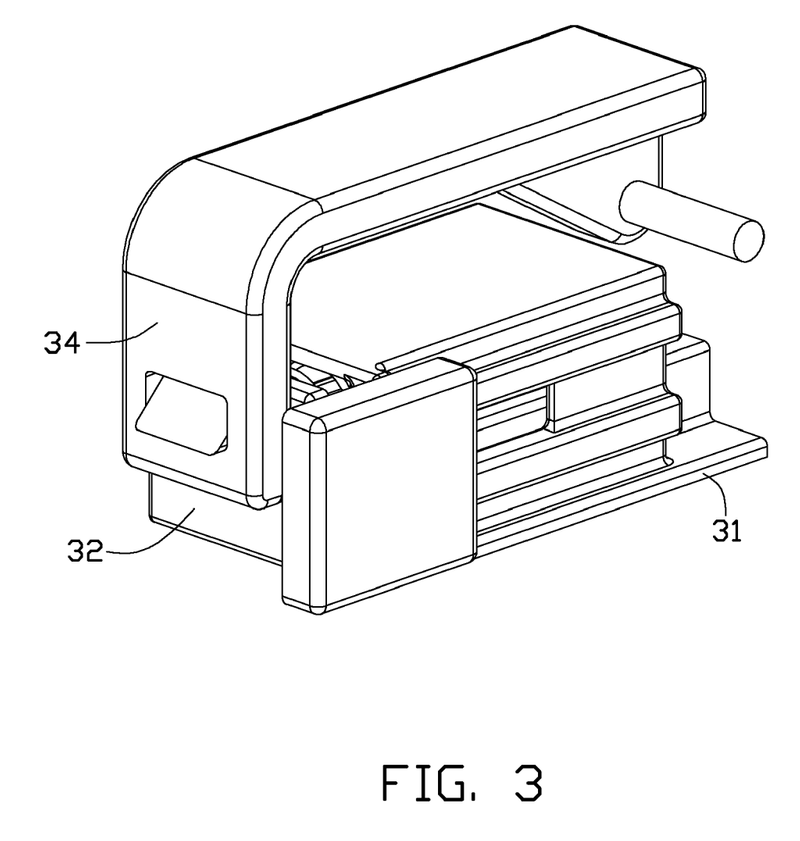
FIG. 3 is a partial, isometric view of a locking mechanism of the portable computer of FIG. 1.
Figure 4:
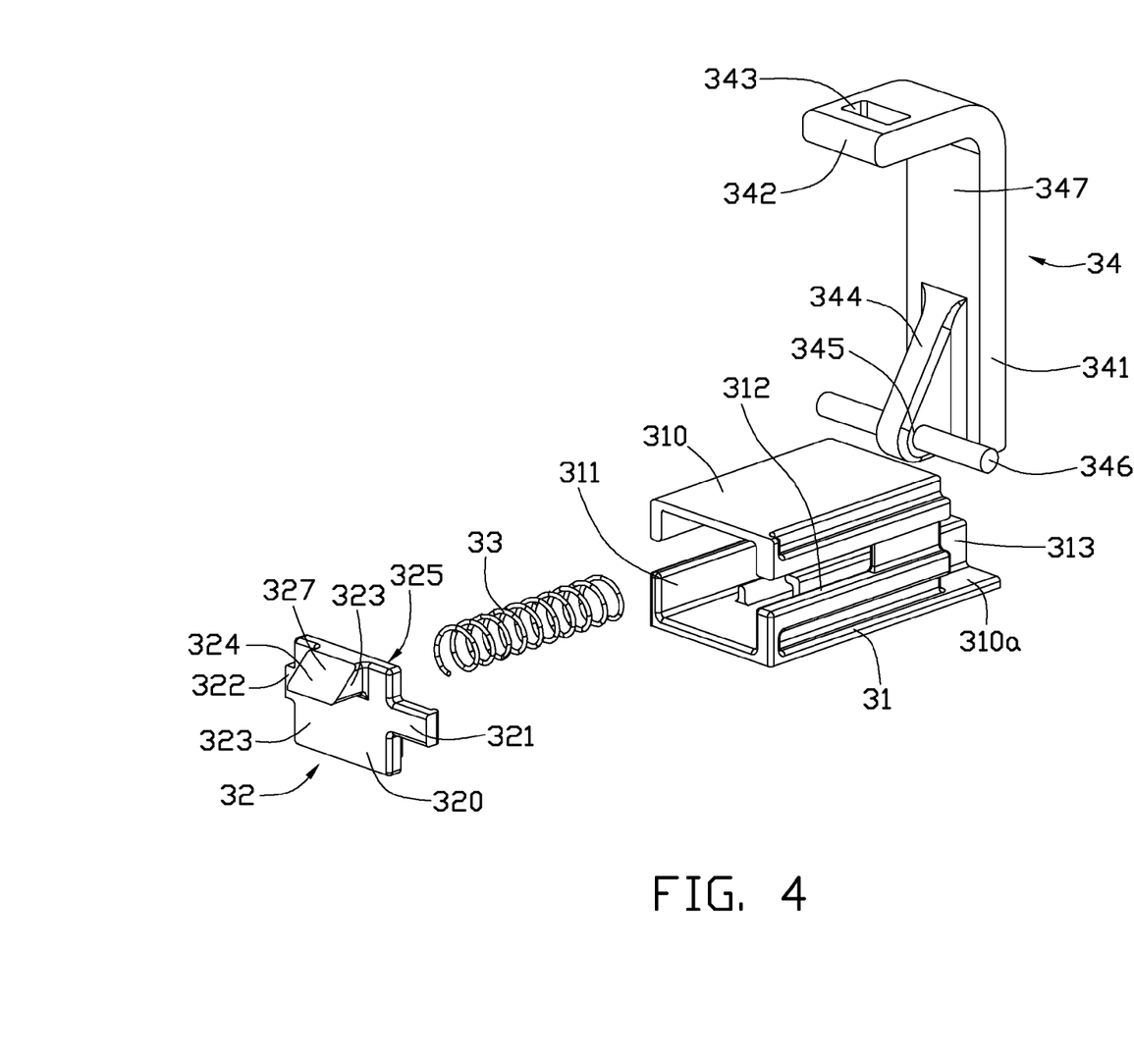
FIG. 4 is an exploded view of the locking mechanism of FIG. 3.

Referring also to FIGS. 3-4, the locking mechanism 30 includes a main body 31, a sliding member 32 slidably connected to the main body 31, an elastic element 33 connected to the main body 31 and the sliding member 32, and a rotation member 34 rotatably connected to the display panel 20.

The main body 31 includes an upper portion 310 and a lower portion 310a. A receiving space 311 is defined between the upper portion 310 and the lower portion 310a. A protrusion portion 313 protrudes from the lower portion 310a. Two opposite sliding grooves 312 are formed between the upper portion 310 and the lower portion 310a in a lengthwise direction of the main body 31.

The sliding member 32 includes a body 320 and two opposite extending tabs 321 and 322 extending from opposites sides of the body 320. In the embodiment, the length of the extending tab 321 exceeds that of the extending tab 322. The body 320 includes a first surface 323 away from the protrusion portion 313 and a second surface 325 opposing the protrusion portion 313. The sliding member 32 further includes a hook portion 324 protruding from the first surface 323 and including a sloped surface 327.

One end of the elastic element 33 is connected to the protrusion portion 313 and received in the receiving space 311, and an opposite end is connected to the second surface 325 of the body 320. The two opposite extending tabs 321 and 322 are slidably received respectively in the two opposite sliding grooves 312, thereby slidably connecting the sliding member 32 to the main body 31. In one embodiment, the elastic element 33 is a coil spring.

The rotation member 34 is rotatably connected to the display panel 20, and is substantially L shaped. The rotation member 34 includes a rotation portion 341, an extending end 342, a protrusion block 344, an axle hole 345 and a shaft 346. The extending end 342 perpendicularly extends from one end of the rotation portion 341. A receiving hole 343 is defined in the extending end 342. The protrusion block 344 extends from an inner surface 347 of the rotation portion 341. The axle hole 345 is defined in the protrusion block 344. The shaft 346 passes through the axle hole 345, and two opposite ends of the shaft 346 are respectively received in two holes (not shown) of the display panel 20, thereby rotatably connecting the rotation member 34 to the display panel 20.

Referring to FIG. 2 again, the base 10 defines a receiving chamber 35 in a top surface thereof, and a hole 351 in a lateral surface 12 thereof. In the embodiment, the hole 351 is elliptical. The hole 351 communicates with the receiving chamber 35. When the display panel 20 covers the base 10, the receiving chamber 35 faces the locking mechanism 30. The portable computer 1 further can be attached to a stationary object (i.e. a desk) by a security lock 36 fastened at one end of a cable (not shown), preventing the portable computer 1 from being stolen. The lock 36 includes a body 361 that includes a keyhole 363 at one end and a rotatable latch 362 at an opposite end. The latch 362 can be inserted into the hole 351. A key (not shown) can then be inserted into the keyhole 363 to rotate the latch 362 to be locked. After being rotated to a locked position, the latch 362 is secured by the hole 351 and cannot be unlocked from the base 10 without the key.

Figure 5:
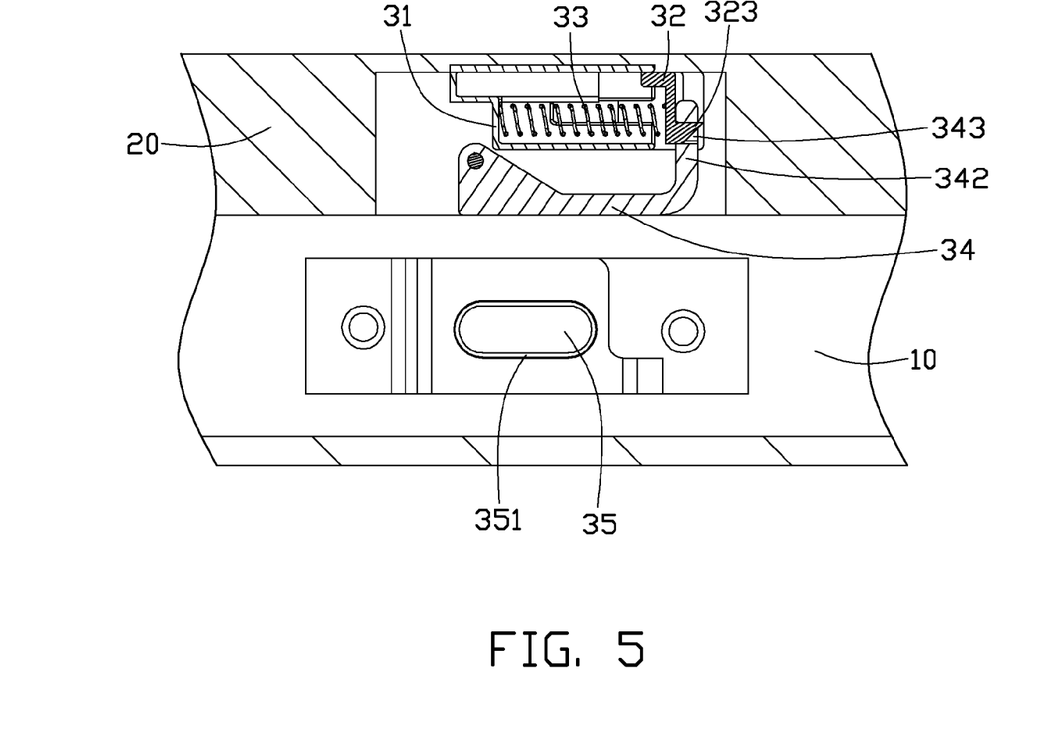
FIG. 5 is a partial, cross-sectional view of the portable computer of FIG. 1 taken along the line V-V in FIG. 1, showing a latch having been inserted into the portable computer.
Figure 6:
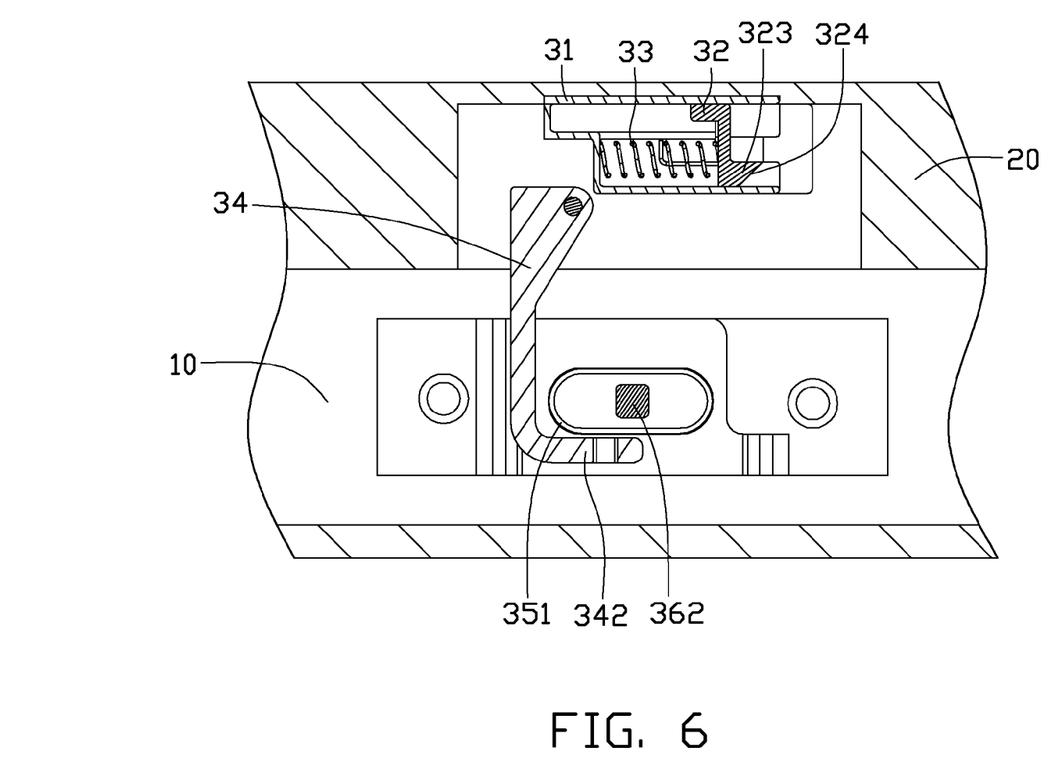
FIG. 6 is similar to FIG. 5, but showing the latch having been rotated at a predetermined angle.

Referring to FIGS. 5-6, during the closing of the display panel 20, the rotation portion 341 is upright in a first position. When the display panel 20 covers the base 10, because the locking mechanism 30 opposes the receiving chamber 35, the extending end 342 engages into the bottom of the receiving chamber 35. The latch 362 can then be inserted into the hole 351 and is located above the extending end 342, thereby preventing the extending end 342 from disengaging from the receiving chamber 35. After that, the display panel 20 is locked to the base 10.

When opening the display panel 20, the key is inserted into the keyhole 363 to rotate the latch 362 from the latched position to an open position. The latch 362 thus frees from the limitation of the hole 351 and can then disengage from the base 10. Without the limitation of the latch 362 being blocking the extending end 342, the display panel 20 can then be opened. During the opening of the display panel 20, the rotation portion 341 is forced by the user to rotate counterclockwise from a first position to resist the sloped surface 327 of the hook portion 324 until the receiving hole 343 of the extending end 342 opposes the hook portion 324 to be in a second position. That is, the rotation portion 341 is not upright in the second position. The sliding member 32 compresses the elastic element 33. After the external force has stopped the elastic element 33 rebounds to push the hook portion 324 to be received in the receiving hole 343 of the rotation member 34.

When attempting to close the display panel 20 again, because the rotation portion 341 is not upright when the display panel 20 is opened, the extending tab 321 is driven to slide along the sliding groove 312 to compress the elastic element 33, causing the hook portion 324 to disengage from the receiving hole 343. After the hook portion 324 disengages from the receiving hole 343, the rotation portion 341 is driven to rotate clockwise from a second position to the first position by the gravity of the extending end 342.

Figure 7:
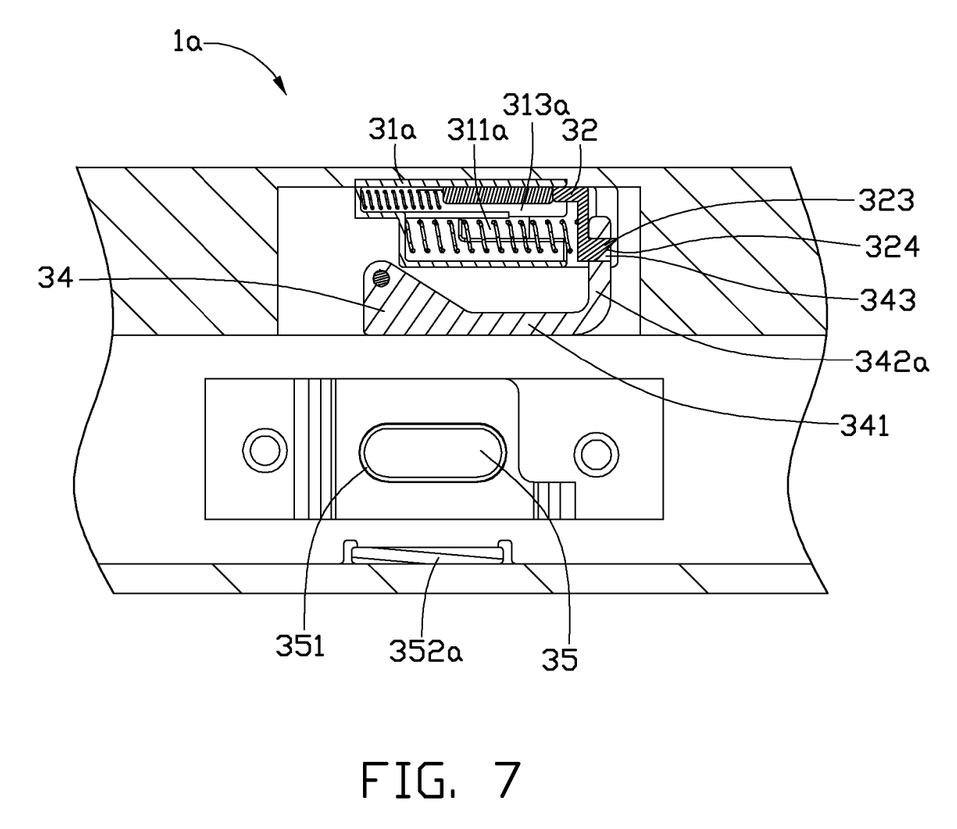
FIG. 7 is similar to FIG. 5, but the portable computer in a second embodiment including a first elastic element and a first magnetic portion.
Figure 8:
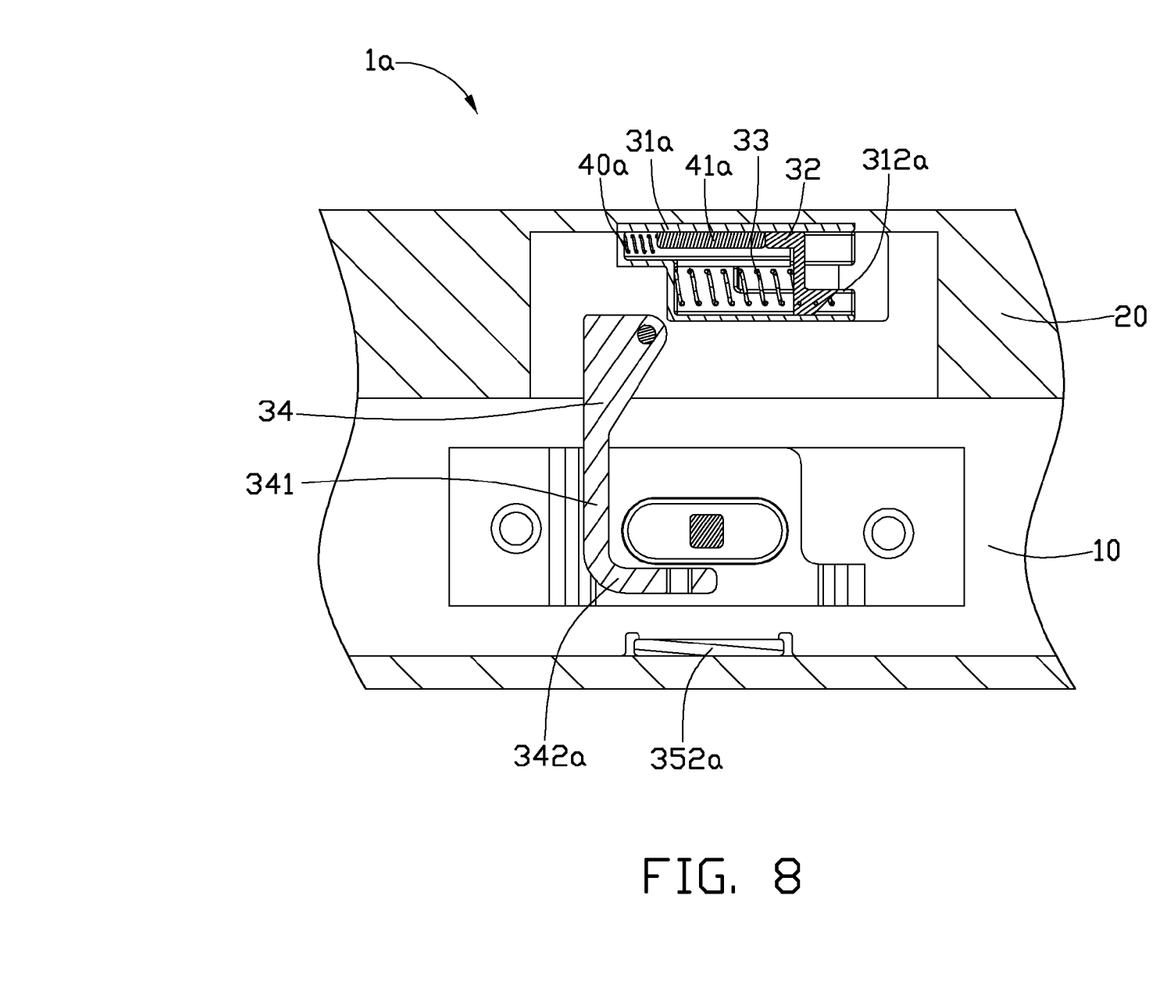
FIG. 8 is similar to FIG. 6, but the portable computer in the second embodiment including a second magnetic portion.

Referring to FIGS. 7-8, a portable computer 1a according to a second embodiment is illustrated. The portable computer 1a includes the locking mechanism 30 including a main body 31*a*, the sliding member 32, a first elastic element 40*a*, the rotation member 34, and a first magnetic portion 41*a*. The rotation member 34 includes an extending end 342*a* which is made of metal.

The main body 31*a* includes a first recessed portion 311*a* and a second recessed portion 313*a*. Two opposite sliding grooves 312*a* are formed in the two opposite sides in the lengthwise direction of the first recessed portion 311*a*.

The elastic element 33 is placed in the first recessed portion 311*a*. One end of the elastic element 33 contacts the main body 31*a*, and an opposite end contacts the sliding member 32. The first elastic element 40*a* and the first magnetic portion 41*a* are placed in the second recessed portion 313*a*. The first elastic element 40*a* is placed between the main body 31*a* and the first magnetic portion 41*a*. The first magnetic portion 41*a* is placed between the first elastic element 40*a* and the sliding member 32. In the embodiment, the elastic element 33 and the first elastic element 40*a* are coil springs, and the first magnetic portion 41*a* is a magnet.

A second magnetic portion 352*a* is placed in the bottom of the receiving chamber 35. In the embodiment, the second magnetic portion 352*a* is a magnet.

During the closing of the display panel 20, the rotation portion 341 is upright in a first position, when the display panel 20 covers the base 10, the locking mechanism 30 opposes the receiving chamber 35, the extending end 342*a* engages into the bottom of the receiving chamber 35. The latch 362 can be inserted into the hole 351 and is located above the extending end 342*a*, thereby preventing the extending end 342*a* from disengaging from the receiving chamber 35. After that, the display panel 20 is locked to the base 10.

When attempting to open the display panel 20, the key is inserted into the keyhole 363 to rotate the latch 362 from the locked position to an open position. The latch 362 is thus freed from the limitation of the hole 351 and can disengage from the base 10. Without the limitation of the latch 362 applied to the extending end 342*a*, the display panel 20 can then be opened. During the opening of the display panel 20, the extending end 342*a* is driven to rotate around the main body 31 a by the magnetic force from the first magnetic portion 41*a*. Because the magnetic force from the first magnetic portion 41*a* applied to the extending end 342*a* exceeds the elastic force from the elastic element 33 and the first elastic element 40*a*, the extending end 342*a* is attracted by the first magnetic portion 41*a* to resist the sloped surface 327 of the hook portion 324 until the receiving hole 343 of the extending end 342*a* opposes the hook portion 324. The hook portion 324 compresses the elastic element 33 and the first elastic element 40*a*. After the receiving hole 343 of the extending end 342*a* opposes the hook portion 324, the elastic element 33 and the first elastic element 40*a* rebound to push the hook portion 324 to be received in the receiving hole 343.

When closing the display panel 20, because the rotation portion 341 is not upright when the display panel 20 is opened. The sliding member 32 is pushed along the sliding grooves 312*a* by the user to cause the hook portion 324 to move away from the receiving hole 343, thus, causing the hook portion 324 to disengage from the receiving hole 343.

The first magnetic portion 41*a* is then driven to move by the sliding member 32, causing the elastic element 33 and the first elastic element 40*a* to be compressed. Because the magnetic force from the first magnetic portion 41*a* applied to the extending end 342*a* is less than the sum of the gravity of the extending end 342*a* and the magnetic force from the second magnetic portion 352*a* applied to the extending end 342*a*, the extending end 342*a* is driven to rotate clockwise from the second position to the first position by the gravity of the extending end 342*a* and the magnetic force from the second magnetic portion 352*a*.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A portable computer comprising:
    a base comprising a receiving chamber and a hole communicating with the receiving chamber;
    a display panel rotatably connected to the base;
    a locking mechanism mounted to the display panel, and comprising:
        a main body;
        a rotation member rotatably connected to the display panel, and comprising an extending end defining a receiving hole, the extending end being operable to be received in the receiving chamber; and
        a sliding member slidably connected to the main body, and comprising a hook portion received in the receiving hole in a first state, wherein the hook portion is capable of disengaging from the receiving hole to be in a second state, causing the extending end to rotate by the gravity thereof; and
    a security lock comprising a latch for engaging the extending end to prevent the extending end of the rotation member from disengaging from the base, to lock the display panel to the base.

2. The portable computer as described in claim 1, wherein the locking mechanism further comprises an elastic element connected between the main body and the sliding member, the main body comprises an upper portion and a lower portion, two opposite sliding grooves are formed between the upper portion and the lower portion, the sliding member further comprises two extending tabs slidably received respectively in the two opposite sliding grooves, thereby slidably connecting the sliding member to the main body.

3. The portable computer as described in claim 2, wherein one of the two extending tabs is pushed to drive the hook portion to compress the elastic element by an external force, causing the hook portion to disengage from the receiving hole.

4. The portable computer as described in claim 2, wherein the hook portion comprises a sloped surface, the extending end is forced by a user to rotate the rotation member around the main body to resist the sloped surface until the receiving hole of the extending end opposes the hook portion, the hook portion compresses the elastic element, after the external force has stopped, the elastic element rebounds to push the hook portion to be received in the receiving hole.

5. The portable computer as described in claim 2, wherein the main body further comprise a protrusion portion protruding from the lower portion, the sliding member further comprises a body comprising a first surface away from the protrusion portion and a second surface opposing the protrusion portion, the two extending tabs are extended respectively from two opposite sides of the body, the hook portion protrudes from the first surface, and one end of the elastic element is connected to the second surface, and an opposite end is connected to the protrusion portion.

6. The portable computer as described in claim 2, wherein the elastic element is a coil spring.

7. The portable computer as described in claim 2, wherein the locking mechanism further comprises a first elastic element and a first magnetic portion, the first elastic element is placed between the first magnetic portion and the main body, the first magnetic portion is placed between the first elastic element and the sliding member, the extending end of the rotation member is made of metal, when the display panel is opened, the first magnetic portion attracts the extending end to rotate around the main body to resist a sloped surface of the hook portion until the receiving hole of the extending end opposes the hook portion, the hook portion compresses the elastic element and the first elastic element, after the receiving hole opposes the hook portion, the first elastic element and the elastic element rebound to push the hook portion to be received in the receiving hole.

8. The portable computer as described in claim 7, wherein the locking mechanism further comprises a second magnetic portion placed on a bottom of the receiving chamber, one of the two extending tabs is pushed to drive the hook portion to compress the first elastic element and the elastic element until the hook portion disengages from the receiving hole, because the magnetic force from the first magnetic portion applied to the extending end is less than the sum of the magnetic force from the second magnetic portion applied to the extending end and the gravity of the extending end, the extending end is driven to rotate to a bottom of the receiving chamber by the sum of the magnetic force from the second magnetic portion and the gravity of the extending end.

9. The portable computer as described in claim 8, wherein the first magnetic portion and the second magnetic portion are magnets.

10. The portable computer as described in claim 7, wherein the first elastic element is a coil spring.

11. The portable computer as described in claim 1, wherein the rotation member further comprises a rotation portion, the extending end perpendicularly extends from one end of the rotation portion.

12. The portable computer as described in claim 11, wherein the rotation member further comprises a protrusion block extending from a surface of the rotation portion, and a shaft, an axle hole is defined in the protrusion block, the shaft passes through the axle hole, and the opposite ends of the shaft are respectively received in two holes of the display panel, thereby rotatably connecting the rotation member to the display panel.

13. The portable computer as described in claim 1, wherein the hole is substantially elliptical.

* * * * *